(12) United States Patent
Rogers et al.

(10) Patent No.: US 8,893,840 B2
(45) Date of Patent: Nov. 25, 2014

(54) ENGINE ENCLOSURE DOOR

(75) Inventors: Travis W. Rogers, Raleigh, NC (US); Robert Wayne Hunter, Jr., Wake Forest, NC (US); Joel R. Grimes, Fuquay-Varina, NC (US); Brian S. Nobles, Raleigh, NC (US)

(73) Assignee: Caterpillar Inc., Peoria, IL (US)

( * ) Notice: Subject to any disclaimer, the term of this patent is extended or adjusted under 35 U.S.C. 154(b) by 442 days.

(21) Appl. No.: 13/169,796

(22) Filed: Jun. 27, 2011

(65) Prior Publication Data

US 2012/0325570 A1 Dec. 27, 2012

(51) Int. Cl.
*B62D 25/10* (2006.01)
*E02F 3/34* (2006.01)
*E02F 9/08* (2006.01)

(52) U.S. Cl.
CPC .............. *E02F 9/0891* (2013.01); *B62D 25/10* (2013.01); *E02F 3/34* (2013.01)
USPC ...................................... 180/69.24; 180/69.2

(58) Field of Classification Search
USPC .............................................. 180/69.2, 69.24
See application file for complete search history.

(56) References Cited

U.S. PATENT DOCUMENTS

| | | | | |
|---|---|---|---|---|
| 1,454,595 A * | 5/1923 | Ashley | ........................ | 180/69.2 |
| 2,672,942 A * | 3/1954 | Bayley | ........................ | 180/69.2 |
| 2,733,772 A * | 2/1956 | Lamb | ........................ | 180/68.1 |
| 2,761,523 A * | 9/1956 | Lee | ............................. | 180/69.2 |
| 2,952,328 A * | 9/1960 | Steiner | ........................ | 180/69.2 |
| 3,216,760 A * | 11/1965 | Buchwald | ........................ | 296/76 |
| 3,754,613 A | 8/1973 | Stephens et al. | | |
| 4,805,264 A | 2/1989 | Benning et al. | | |
| 5,645,134 A * | 7/1997 | Frankel et al. | ............. | 180/69.24 |
| 5,836,050 A | 11/1998 | Rumez et al. | | |
| 6,116,366 A * | 9/2000 | Creswick et al. | ........... | 180/69.2 |
| 6,626,256 B2 * | 9/2003 | Dennison et al. | .......... | 180/69.24 |
| 6,655,486 B2 * | 12/2003 | Oshikawa et al. | ........... | 180/68.1 |
| 6,910,545 B2 * | 6/2005 | Haun | ........................... | 180/69.2 |
| 7,096,987 B2 * | 8/2006 | Moen et al. | .................. | 180/69.2 |

(Continued)

FOREIGN PATENT DOCUMENTS

| | | |
|---|---|---|
| DE | 1241292 | 5/1967 |
| DE | 102009050189 | 4/2011 |
| JP | 59089272 | 5/1984 |
| JP | 2010058614 | 3/2010 |

OTHER PUBLICATIONS

Photo for a Hood Hinge for Indian Manufactured car—Maruti 800 available on or before Apr. 1, 2011.

*Primary Examiner* — Jeffrey J Restifo
(74) *Attorney, Agent, or Firm* — Miller, Matthias & Hull

(57) ABSTRACT

An engine enclosure and a method for assembling such an engine enclosure for a vehicle are disclosed. The engine enclosure may comprise a hood, a first door, a second door, a first fender and a second fender and a plurality of hinges. The hood may be disposed above the engine and may have an inset rim extending along a side of the hood. The door may be moveable between a generally vertical closed position and an open position. The door may include an upper edge, a non-metallic interior panel, and a non-metallic exterior panel fixedly joined to the interior panel. Each hinge may be attached to the hood and a door, and may be configured to rotate the door through a swing angle and to lift the upper edge of the door above the rim when the door is moved from the closed position to the open position.

18 Claims, 5 Drawing Sheets

(56) References Cited

U.S. PATENT DOCUMENTS

| | | | |
|---|---|---|---|
| 7,604,077 B2* | 10/2009 | Renard | 180/69.2 |
| 7,673,716 B2* | 3/2010 | Moen et al. | 180/69.2 |
| 7,992,665 B2* | 8/2011 | Giovannini et al. | 180/69.2 |
| 8,230,960 B2* | 7/2012 | Shoen | 180/69.21 |
| 2001/0004949 A1* | 6/2001 | Burgo | 180/69.2 |
| 2004/0244229 A1 | 12/2004 | Smith et al. | |
| 2006/0000660 A1* | 1/2006 | Moen et al. | 180/309 |
| 2006/0249988 A1 | 11/2006 | Jones | |
| 2009/0020349 A1* | 1/2009 | Renard | 180/69.2 |
| 2010/0077667 A1 | 4/2010 | Uto et al. | |
| 2011/0035903 A1* | 2/2011 | Sims | 16/293 |

\* cited by examiner

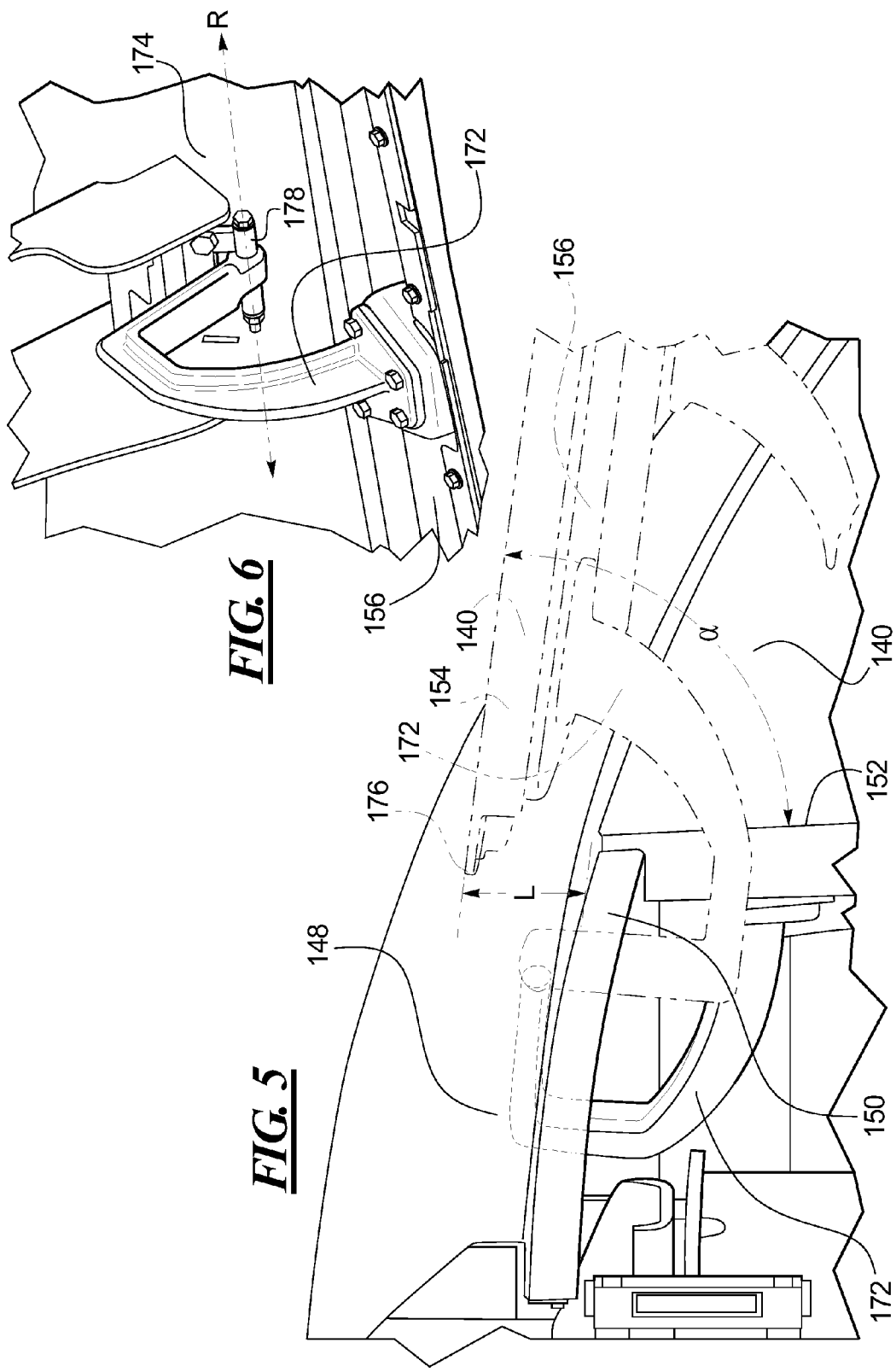

ENGINE ENCLOSURE DOOR

TECHNICAL FIELD

The present disclosure generally relates to engine enclosures of vehicles and, more particularly, relates to engine enclosure doors on vehicles used in earth moving, construction, agriculture, material handling, mining applications, and the like.

BACKGROUND

The engine enclosure doors on industrial vehicles such as those used in earth moving, construction, agriculture, material handling, mining applications, and the like are typically metal or a combination of a composite surrounded by a metal frame in order to meet stress and durability requirements. In addition, such engine enclosure doors typically open similar to a car door, horizontally. This horizontal opening limits the angle of access to the engine and other components within the enclosure. Further, when vehicles having such doors are parked for maintenance, the vehicles must be parked far enough away from each other so that the open engine enclosure doors do not interfere with each other. This is undesirable because of the large size of these machines relative to the space in the facility in which the machine is to be serviced.

U.S. Pat. No. 4,805,264 ("Benning et al.") issued Feb. 21, 1989 is an example of prior art related to engine doors. FIG. 1 of Benning et al. illustrates an engine hood designed to be opened vertically. The hood pivots on a forked bearing and the angle of opening is limited by a guide and cam follower attached to hood. To gain full access to the top of the engine, the hood must be removed. A better design is needed that provides a relatively light weight door that provides unobstructed access to the side of a vehicle engine without having to remove the door from the enclosure.

SUMMARY OF THE DISCLOSURE

In accordance with one aspect of the disclosure, an enclosure is disclosed that is disposed around an engine of a vehicle. The enclosure may comprise a hood, a door and a hinge. The hood may be disposed above the engine and may have an inset rim extending along a side of the hood. The door may be moveable between a generally vertical closed position and a generally horizontal open position. The door may include an upper edge, a non-metallic interior panel, and a non-metallic exterior panel fixedly joined to the interior panel. The hinge may be attached to the hood and to the door and may be configured to rotate the door through a swing angle and to lift the upper edge of the door above the rim when the door is moved from the closed position to the open position.

In accordance with another aspect of the disclosure, an enclosure is disclosed that is disposed around an engine of a vehicle. The enclosure may comprise a hood, a first door, a first fender and a first hinge. The hood may be disposed above the engine. The hood may have a first inset rim extending along a first side of the hood and a second inset rim extending along a second side of the hood, the second side opposite to the first side of the hood. The first door may be moveable between a generally vertical closed position and an open position. The first door may include a first upper edge, a first non-metallic interior panel, and a first non-metallic exterior panel fixedly joined to the first interior panel. The fender may be non-metallic and may be attached to the first door. The first hinge may be attached to the hood and to the first interior panel. The first hinge may be configured to rotate the first door and the first fender through a swing angle and to lift the first upper edge of the first door and at least a portion of the first fender above the first rim when the first door is moved from the closed position to the open position. The swing angle may be in the range of 60° to 120°.

In accordance with a further aspect of the disclosure, a method of assembling a engine enclosure for a vehicle is disclosed. The method may comprise providing an enclosure including a hood, a first fender, and a first hinge pivotally attached to the hood, and providing a first door including a non-metallic interior panel and a non-metallic exterior panel adhered together. The method may further include bolting the first hinge to the first door, and bolting the first fender to the first door. In addition, the method may also include providing a second hinge, a second fender and a second door, wherein the second hinge is attached to the hood, positioning the second door opposite to the first door, bolting the second hinge to the second door, and bolting the second fender to the second door.

BRIEF DESCRIPTION OF THE DRAWINGS

FIG. 5 is a cut-away view of the hinge, in accordance with the teachings of this disclosure, when the door is in the closed position and when the door is in the open position; and FIG. 6 is perspective view of the hinge attached to the hood of the engine enclosure.

DETAILED DESCRIPTION

Figure 1:
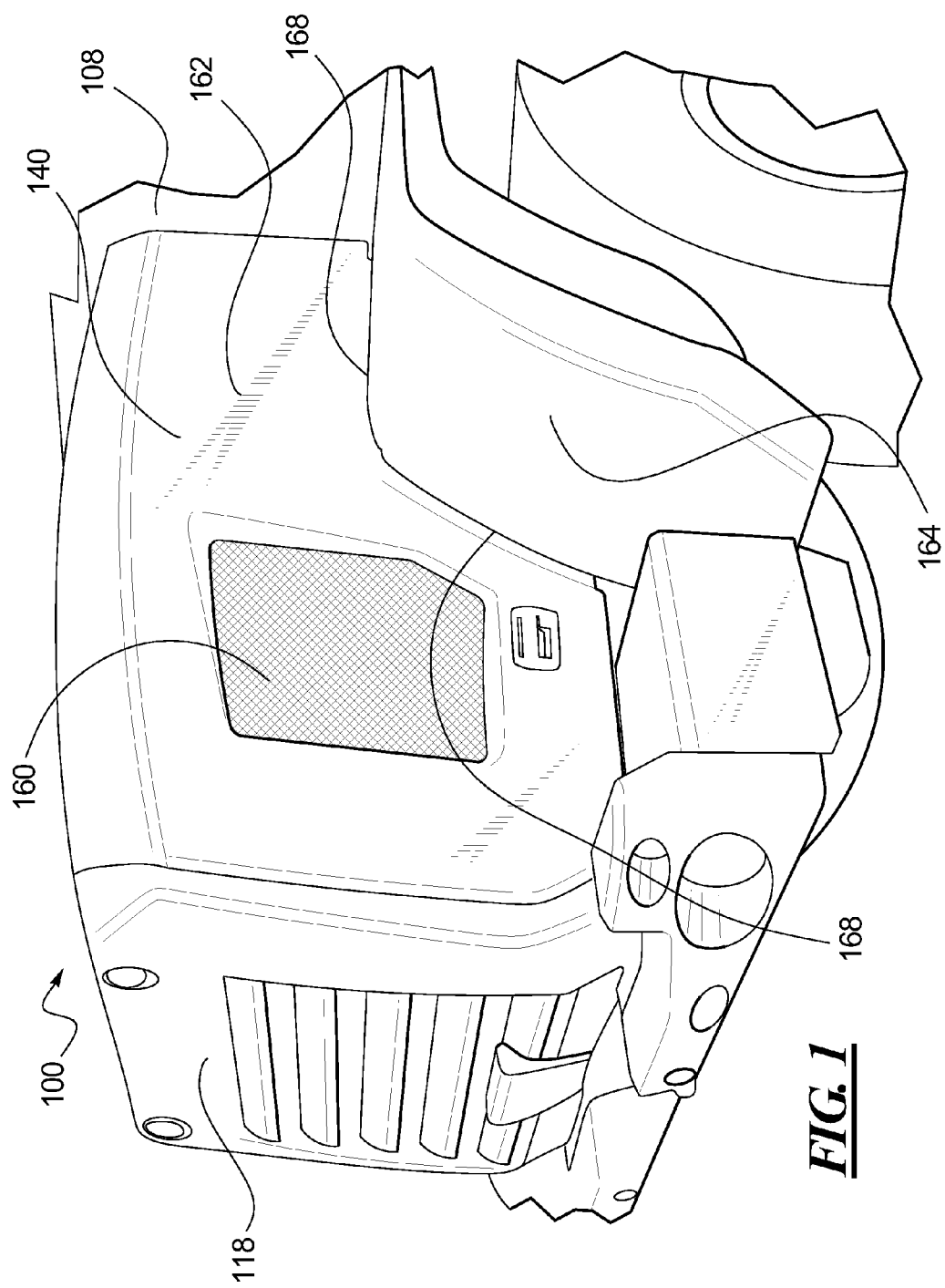
FIG. 1 is a perspective view of an exemplary engine enclosure including a first side door and fender, constructed in accordance with the teachings of this disclosure.
Figure 2:
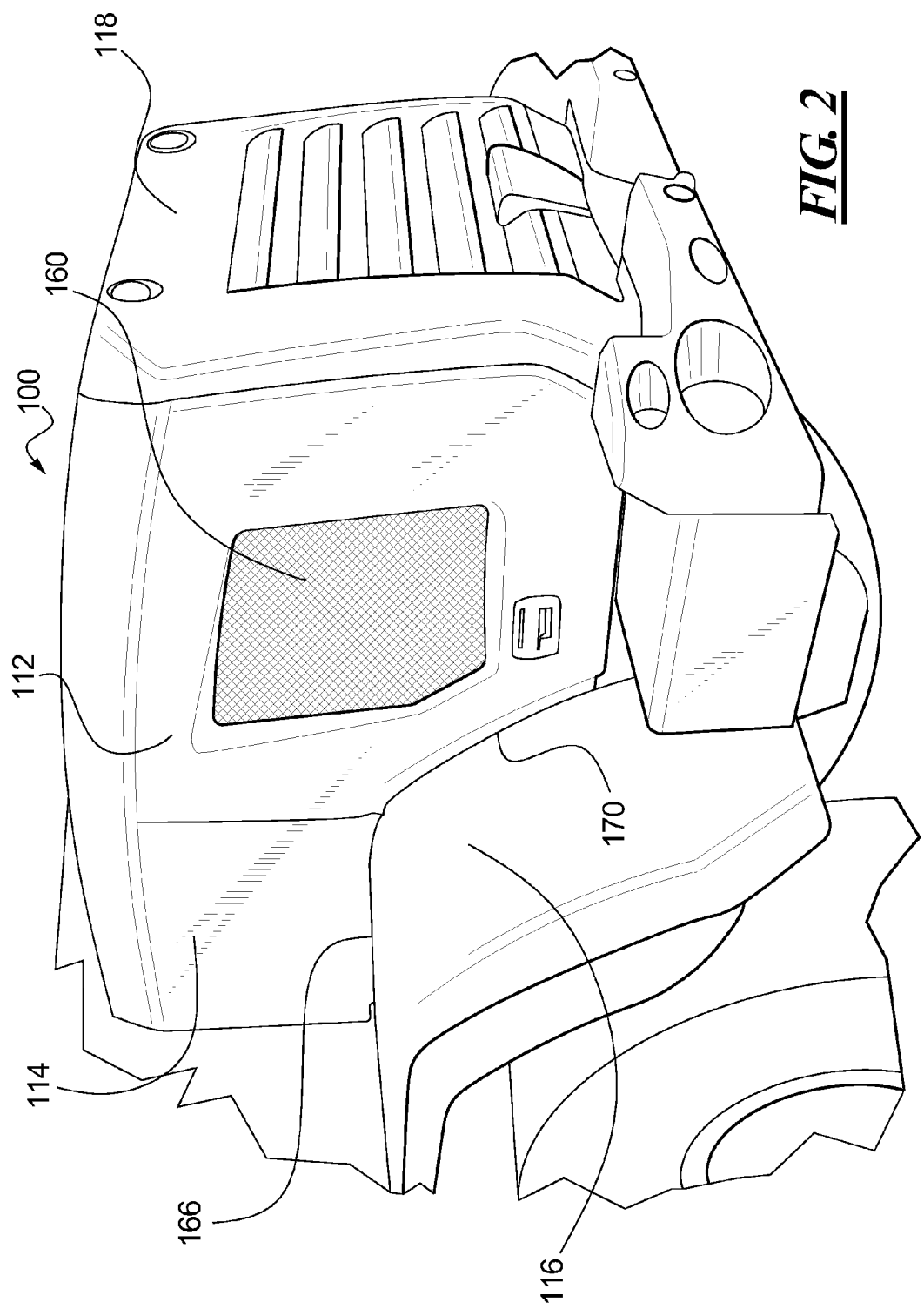
FIG. 2 is a perspective view of the opposite side of the exemplary engine enclosure of FIG. 1 in which the second side door and fender are visible.
Figure 3:
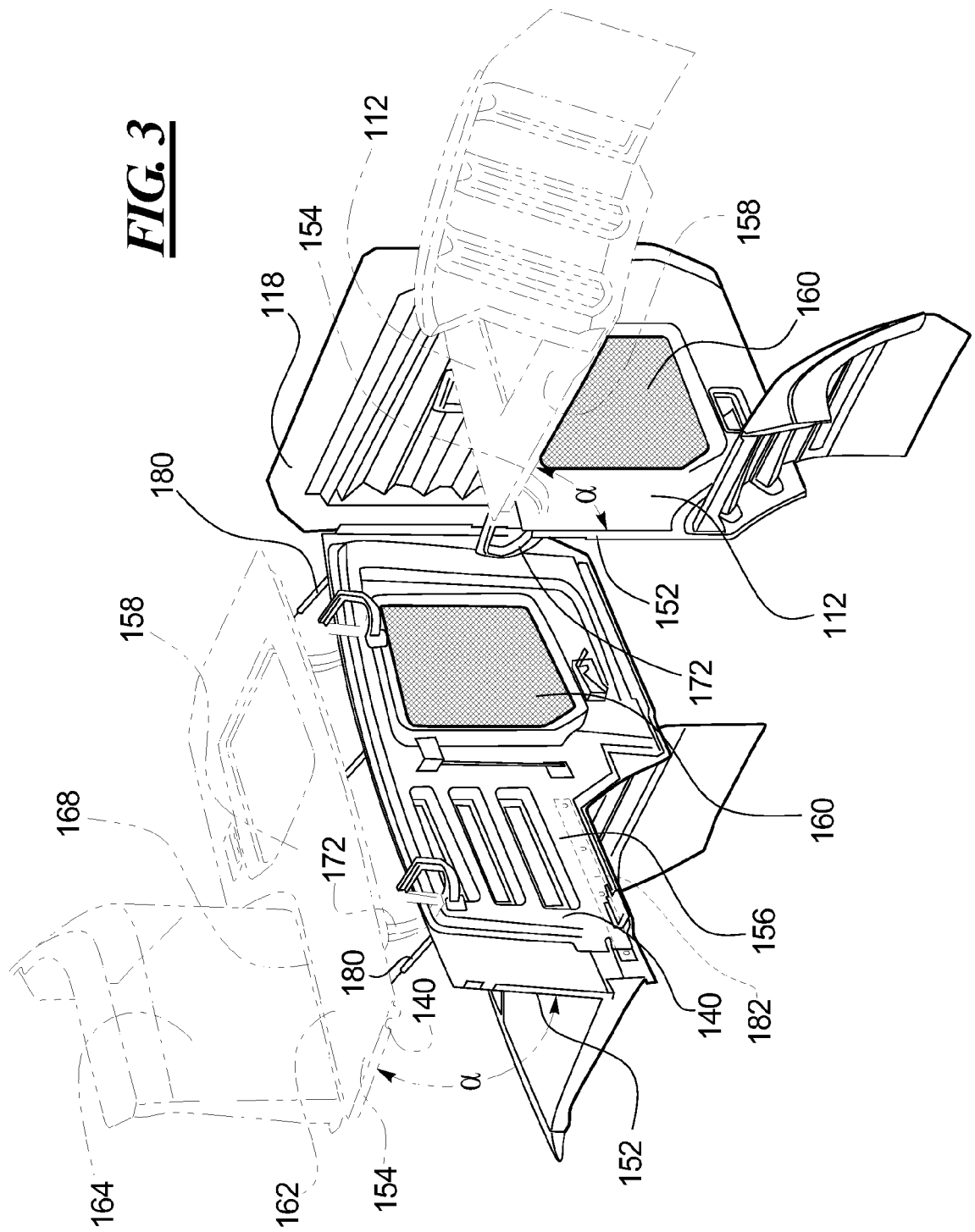
FIG. 3 is a perspective view of the first and second doors, each shown in the closed position and in the open position.

Referring now to the drawings, and with specific reference to FIGS. 1-4 there is shown an engine enclosure constructed in accordance with the present disclosure and generally referred to by reference numeral 100. While the following detailed description and drawings are made with reference to an engine enclosure 100 of a wheel loader, the teachings of this disclosure may be employed on other earth moving, construction, agricultural, material handling or mining vehicles, or the like.

Figure 4:
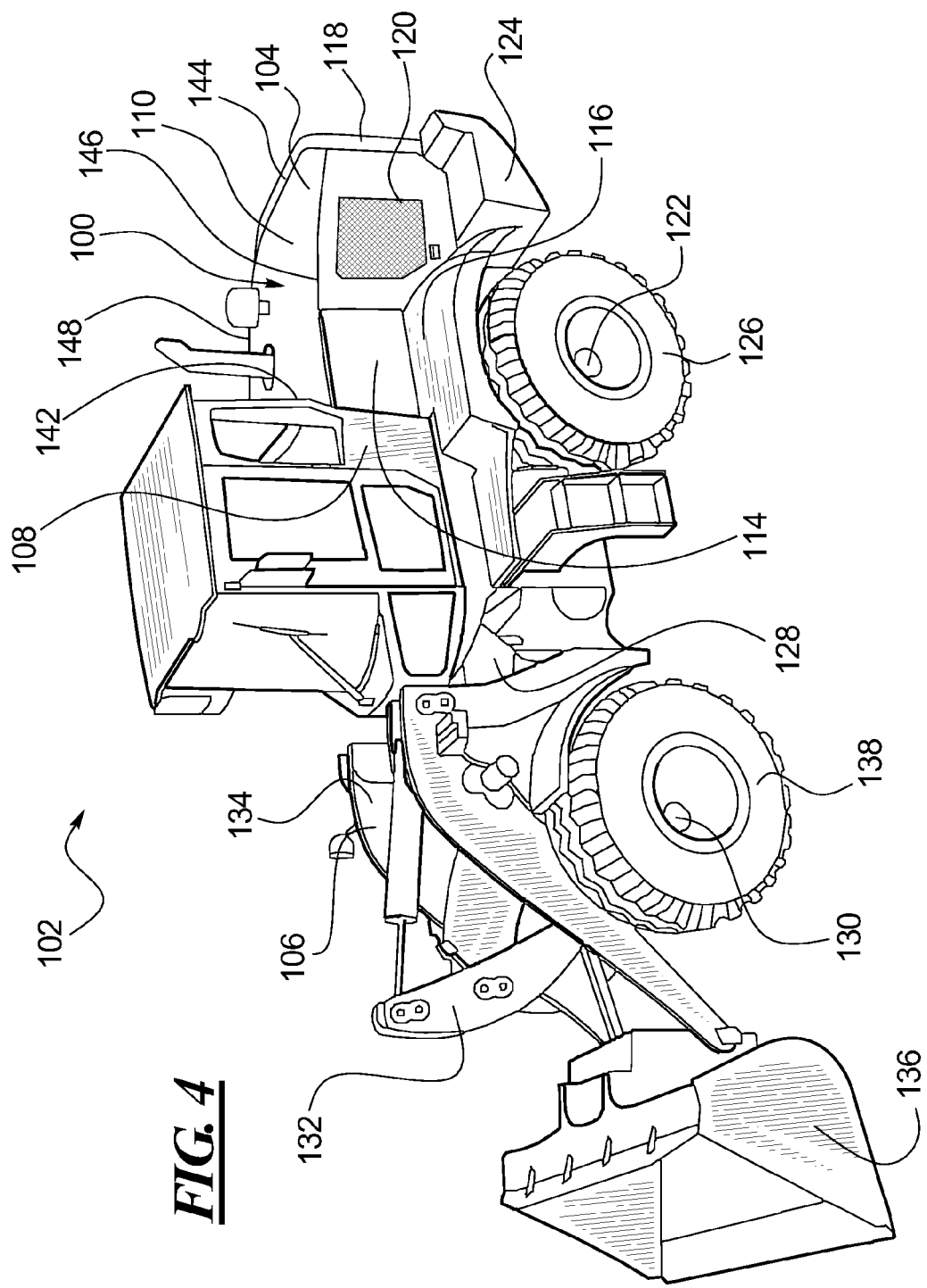
FIG. 4 is perspective view of a vehicle that incorporates the features of the present disclosure.

FIG. 4 illustrates one example of a vehicle 102 that incorporates the features of the present disclosure. The vehicle 102 includes a rear portion 104 and a front portion 106. The rear portion 104 may include a cab assembly 108, an engine enclosure 100 including a hood 100, door 112, sidewall 114, fender 116 and radiator cover 118, an engine 120, a rear axle housing assembly 208, and drive train components (not shown) mounted to a rear frame 124. Rear wheels 126 may be mounted to the rear axle housing assembly 122. The front portion 106 may include a frame assembly 128 and a front axle housing assembly 130. A boom assembly 132 and a lift arm assembly 134 may be mounted on the frame assembly 128. An implement 136 may be attached to the boom assembly 132 and to the lift arm assembly 134. The front wheels 138 may be mounted on the front axle housing assembly 130.

Turning now to FIGS. 1-4, the engine enclosure 100 may be disposed around an engine 120 of a vehicle 102 and may comprise a hood 110, a first door 140, a second door 112, and a radiator cover 118 that is positioned adjacent to the hood 110 and disposed between the first and second doors 140, 112. In some embodiments, the enclosure 100 may also comprise a sidewall 114 that is disposed adjacent to the hood 110 and is positioned between the cab assembly 108 and the second door 112.

The hood 110 may be disposed above the engine 120 of the vehicle 102. The hood 110 may have a front end 142, a back end 144, a left side 146 and a right side 148. The hood 110 may be generally planar or may have generally curved edges. The hood 110 may have an inset rim 150 (FIG. 5) extending along the left and right sides 146, 148 of the hood 110. In some embodiments, the rim 150 may be generally vertical. The engine radiator cover 118 is attached at the top of the cover 118 to the hood 110.

With regard to the engine enclosure 100, the second door 112 is disposed opposite to the first door 140. The first and second doors 140, 112 are each outwardly moveable between a generally vertical closed position 152 and a generally horizontal open position 154. Each first and second door 140, 112 may be adjacent to and generally parallel to a rim 150 of the hood 110 when the door 140, 112 is in the closed position 152. In some embodiments, the first door 140 may be generally L-shaped and may be at one end adjacent to the radiator cover 118 and at the other end adjacent to the cab assembly 108. Thus, when the first door 140 is in the open position 154, access may be substantially had to the entire contents of one side of the engine enclosure 100. In other embodiments, the sidewall 114 of the enclosure 100 may be eliminated and a second door 112 may be provided that is similar to the first door 140 and, as such, allow the second door 112 to provide access similar to that provided by the first door 140 to the contents of the engine enclosure 100. Conversely, a first door 140 may be utilized for the enclosure 100 that is similar to the second door 112. In such an embodiment, the engine enclosure 100 may include a second sidewall opposite to the first sidewall.

The first and second doors 140, 112 may each include a non-metallic interior panel 156 and a non-metallic exterior panel 158 fixedly joined to the interior panel 156. The interior and exterior panels 156, 158 may be fused together. In one embodiment, the interior and exterior panels 156, 158 are fused together by an adhesive. In an embodiment, the interior and exterior panels 156, 158 may be made of sheet molding compound, a fiberglass composite, or other appropriate non-metallic material. The interior and exterior panels 156,158 may have an opening in which a grill 160 is disposed. In such an embodiment, the interior and exterior panels 156, 158 may frame the grill 160. The grill 160 may allow heat to vent from the engine 120 and air to circulate to the engine 120 through a honeycomb structure, hatched structure, or the like. Each of the first and second doors 140, 112 may also include one or more bolted joint abutments 182. The abutments 182 may be used to reinforce the areas of the doors 140, 112 around bolted joints, including but not limited to, areas where a fender or a hinge 172 may be bolted to the door 140, 112. Such an abutment may be disposed between a portion of the interior panel 156 and a portion of the exterior panel 158. In one embodiment, the abutment 182 may be bonded or adhered to a portion of at least one of the panels 156, 158 of the door 140, 112. The abutments 182 may be steel, or the like, and may be plate-like or another appropriate geometry for reinforcement of bolted joints.

The enclosure 100 may also include a fender 164, 116 attached to each door 140, 112. The fender 164, 116 may be made of a non-metallic material. Non-metallic materials used for the fender 164 may include, but are not limited to, Dicyclopentadiene (DCPD) or the like. In one embodiment, the fender 164, 116 may be bolted to the door 140, 112. In other embodiments, other types of fasteners known in the art may be used. In the embodiment illustrated in FIG. 1, the first door 140 is generally L-shaped and has an extension portion 162 that is disposed over the first fender 164. The first fender 164 is attached along at least a portion of the lower edge 168 of the first door 140. In the embodiment illustrated in FIG. 2, a second fender 116 is attached along a side edge 170 of the second door 112 but not along the bottom edge 166 of the sidewall 114.

The engine enclosure 100 may further comprise a plurality of hinges 172. FIGS. 5-6 illustrate an embodiment of the hinges 172. At least one hinge 172 may be disposed on the right side 148 of the hood 110 and at least one hinge 172 may be disposed on the left side 146 of the hood 110. In some embodiments, a pair of hinges 172 may be disposed on the left side 146 of the hood 110 and a pair of hinges 172 may be disposed on the right side 148 of the hood 110. In other embodiments, more hinges 172 may be utilized. The hinges 172 may be a metallic cast material, or the like and may be, but are not limited to, generally C-shaped. Each hinge 172 is attached to both the hood 110 and to the door 140, 112. Preferably the hinge 172 is attached to the inner surface 174 of the hood 110 and the interior panel 156 of the door 140, 112. The hinge is bolted to the door 140, 112. Other fasteners known in the art may also be used.

In FIG. 5, a cut-away view is shown of the door 112, 140 in the closed position 152 and in the open position 154. As illustrated in FIG. 5, the hinge 172 is configured to rotate the door 112, 140 outward through a swing angle $\alpha$ and to lift the upper edge 176 of the door 112, 140 a distance L above the rim 150 of the hood 110 when the door 112, 140 is moved from the closed position 152 to the open position 154.

In an embodiment, the hinge 172 is configured to also lift at least a portion of the fender 116, 164 above the rim 150 of the door 112, 140 when the door 112, 140 is moved from the closed position 152 to the open position 154. In some embodiments, the entire fender 116, 164 may be lifted above the rim 150. Since the first and second doors 140, 112 are positioned on opposite sides of the hood 110, the hinge 172, or hinges, attached to the second door 112 will rotate the second door 112 through a swing angle $\alpha$ in a direction that is opposite to the rotation of the first door 140. In one embodiment illustrated in FIG. 6, the hinge 172 rotates, or pivots, around a pin 178 disposed along an axis R that is generally parallel to the rim 150.

In an embodiment, the swing angle $\alpha$ may be about 90°. In another embodiment, the swing angle $\alpha$ between the closed position 152 and the open position 154 may be in the range of about 90° to about 99°. In a further embodiment, the swing angle between the closed position 152 and the open position 154 may be in the range of about 81° to about 90°. Thus, a generally horizontal open position 154 includes a swing a of 90°, plus or minus 10%. In other embodiments, a narrower or wider swing angle $\alpha$ is possible if the open position 154 is not generally horizontal. Such a swing angle $\alpha$ includes, but is not limited to, about 115°, about 125°, about 135°, about 65°, or about 75°.

One or more struts 180 may be attached at one end to each door 112, 140 and to the vehicle at the other end. In an embodiment, the struts 180 may be telescoping gas charged cylinders as are known in the art and may be configured to help move the door 112, 140 to the open position 154. Once in the open position 154, the struts 180 may be configured to releasably lock or hold the door 112, 140 in place until it is moved to the closed position 152.

A method of assembling an engine enclosure 100 for a vehicle 200 is also disclosed. The method may comprise providing an enclosure 100 including a hood 110, a first fender 164, and a first hinge 172 pivotally attached to the hood 110, and providing a first door 140 including a non-metallic interior panel 156 and a non-metallic exterior panel 158 adhered together. The method may further include bolting the first hinge 172 to the first door 140 and bolting the first fender 164 to the first door 140. The method may further include providing a second hinge 172, a second fender 116 and a second door 112, wherein the second hinge 172 is attached to the hood 110, positioning the second door 112 opposite to the first door 140, bolting the second hinge 172 to the second door 112, and bolting the second fender 116 to the second door 112.

INDUSTRIAL APPLICABILITY

Engine enclosures surround and protect the engine of a vehicle. From time to time, the engine and other components situated near the engine must be accessed for repair or maintenance, and the like. Easy, convenient access is desired. The present disclosure may find applicability in providing a relatively lightweight door and fender arrangement that opens to provide unobstructed access to the engine without impeding access to other adjacent vehicles parked alongside.

Each hinge is attached to the hood of the enclosure and a door and is configured to rotate the door outward between a generally vertical closed position and an open position. In some embodiments, the open position may be generally horizontal. The hinge is configured to do so by rotating the door through a swing angle and lifting the upper edge of the door above the rim. The door is held open by a strut at the swing angle. By rotating the door vertically overhead, this provides unobstructed access to the engine and moves the doors out of the way of other closely parked vehicles. By attaching the fender to the doors, this further increases the ease of access to internal components and moves the fenders out of the way of maintenance personnel and other adjacent vehicles. In addition, the use of non-metallic interior and exterior panels as well as non-metallic fenders decreases the weight of the door and fender arrangement to be lifted without sacrificing the structural integrity and heat resistance requirements of both. Further the ability to simply "bolt" or fasten the door to the hinge and the fender to the door, greatly reduces assembly time while still providing a secure connection.

The features disclosed herein may be particularly beneficial to wheel loaders and other earth moving, construction, agricultural, mining or material handling vehicles.

What is claimed is:

1. An enclosure disposed around an engine of a vehicle, the enclosure comprising:
   a hood disposed above the engine, the hood having an inset rim extending along a side of the hood;
   a door moveable between a generally vertical closed position and a generally horizontal open position, the door including an upper edge, a lower edge, an interior panel, and an exterior panel fixedly joined to the interior panel; and
   a hinge attached to the hood and to the door, the hinge configured to rotate the door through a swing angle and to lift the upper edge of the door above the rim when the door is moved from the closed position to the open position,
   wherein, when the door is in the closed position, the upper edge is disposed adjacent to the hood and the door is substantially vertical from the upper edge to the lower edge.

2. The enclosure of claim 1, wherein the door is generally parallel to the rim of the hood when the door is in the closed position.

3. The enclosure of claim 1, in which the door further includes a bolted joint abutment disposed at least partially between the interior and exterior panels, wherein the interior and exterior panels are each made of sheet molding compound and are fused together by an adhesive.

4. The enclosure of claim 1, further including a fender attached to the door.

5. The enclosure of claim 4, wherein the fender is non-metallic and is bolted to the door, and the interior and exterior panels of the door are non-metallic.

6. The enclosure of claim 4, in which the door further comprises a side edge, wherein the fender is attached to the door along the side edge.

7. The enclosure of claim 4, in which the door further includes a lower edge and an extension portion that is disposed over the fender, wherein the door is generally L-shaped and the fender is attached to the door along the lower edge of the door.

8. The enclosure of claim 1, wherein the swing angle when the door is in the open position is in the range of about 81° to about 90°.

9. The enclosure of claim 1, wherein the swing angle when the door is in the open position is in the range of about 90° to about 99°.

10. The enclosure of claim 1, wherein the vehicle is a wheel loader.

11. The enclosure of claim 1, in which the door further includes a grill, the interior and exterior panels framing a perimeter of the grill.

12. The enclosure of claim 1, wherein the hinge is pivotable around a single axis.

13. The enclosure of claim 1, wherein the hinge is bolted to the door.

14. An enclosure disposed around an engine of a vehicle, the enclosure comprising:
   a hood disposed above the engine, the hood having a first inset rim extending along a first side of the hood and a second inset rim extending along a second side of the hood, the second side opposite to the first side of the hood;
   a first door substantially disposed below the hood, the first door moveable between a generally vertical closed position and an open position, the first door including a first upper edge, a lower edge, a first non-metallic interior panel, and a first non-metallic exterior panel fixedly joined to the first interior panel;
   a first non-metallic fender attached to the first door; and
      a first hinge attached to the hood and to the first interior panel, the first hinge configured to rotate the first door and the first fender through a swing angle and to lift the first upper edge of the first door and at least a portion of the first fender above the first rim when the first door is moved from the closed position to the open position, wherein the swing angle is in the range of 60° to 120°,
   wherein, when the door is in the closed position, the upper edge is disposed adjacent to the hood and the door is substantially vertical from the upper edge to the lower edge.

15. The enclosure of claim 14, further comprising a second door, the second door moveable between the generally vertical closed position and the open position, the second door including a second upper edge, a second non-metallic interior panel, and a second non-metallic exterior panel fixedly joined to the second interior panel, the second door disposed opposite to the first door.

16. The enclosure of claim 14, further comprising:
a second non-metallic fender attached to the second door; and
a second hinge attached to the hood and to the second door, the second hinge configured to rotate the second door and the second fender through the swing angle in a direction opposite to a rotation of the first door and configured to lift the second upper edge of the second door and at least a portion of the second fender above the second rim when the second door is moved from the closed position to the open position.

17. The enclosure of claim 14, wherein the swing angle when the door is in the open position is in the range of about 81° to about 90°.

18. The enclosure of claim 14, wherein the swing angle when the door is in the open position is in the range of about 90° to about 99°.

* * * * *